(12) United States Patent
Srivastava et al.

(10) Patent No.: US 10,180,925 B2
(45) Date of Patent: Jan. 15, 2019

(54) INTEGRATED CIRCUIT WITH PIN LEVEL ACCESS TO IO PINS

(71) Applicant: FREESCALE SEMICONDUCTOR, INC., Austin, TX (US)

(72) Inventors: Rajan Srivastava, Noida (IN); Girraj K. Agrawal, Noida (IN)

(73) Assignee: NXP USA, INC., Austin, TX (US)

( * ) Notice: Subject to any disclaimer, the term of this patent is extended or adjusted under 35 U.S.C. 154(b) by 491 days.

(21) Appl. No.: 15/081,944

(22) Filed: Mar. 28, 2016

(65) Prior Publication Data

US 2017/0277647 A1 Sep. 28, 2017

(51) Int. Cl.
*G06F 13/00* (2006.01)
*G06F 13/40* (2006.01)
*G06F 13/16* (2006.01)

(52) U.S. Cl.
CPC .......... *G06F 13/4068* (2013.01); *G06F 13/16* (2013.01)

(58) Field of Classification Search
CPC .............................. G06F 13/16; G06F 13/4068
See application file for complete search history.

(56) References Cited

U.S. PATENT DOCUMENTS

| 4,964,074 A * | 10/1990 | Suzuki ................ G06F 11/3648 703/28 |
| 5,923,894 A | 7/1999 | Sollars |
| 6,532,533 B1 * | 3/2003 | Bhandal .............. G06F 9/30018 711/163 |
| 6,725,441 B1 | 4/2004 | Keller et al. |
| 6,816,919 B2 | 11/2004 | Gareis et al. |
| 7,484,027 B1 | 1/2009 | Dahlin |
| 9,129,072 B2 | 9/2015 | Mishra et al. |
| 2013/0080677 A1 | 3/2013 | Simmons |
| 2013/0111099 A1 | 5/2013 | Nie et al. |

\* cited by examiner

*Primary Examiner* — Zachary K Huson
(74) *Attorney, Agent, or Firm* — Charles E. Bergere

(57) ABSTRACT

An integrated circuit (IC) having multiple cores controls write access to its input/output (I/O) pins. The IC includes a pin-control circuit, a memory, and a set of I/O pins. The pin-control circuit allows a core to independently control individual ones of the I/O pins. A set of pin-control values are defined that correspond to the set of I/O pins to indicate a type of core that can access an I/O pin. The pin-control circuit receives the pin-control values, a source ID, and write data generated by a core, and updates a pin data bit stored in the memory with a corresponding bit of the write data when the core is allowed to access the I/O pin. The pin-control circuit does not change the pin data bit when the core is denied write access to the I/O pin.

17 Claims, 2 Drawing Sheets

INTEGRATED CIRCUIT WITH PIN LEVEL ACCESS TO IO PINS

BACKGROUND

The present invention relates generally to integrated circuits, and more particularly, to pin level access to general purpose input/output (GPIO) pins by one or more cores or an integrated circuit.

Multi-core systems include various types of cores, like graphic processors, general purpose processors, and digital signal processors (DSP), integrated on a single integrated circuit (IC). The cores communicate with external devices by way of input/output (I/O) pins. Recent developments have led to a requirement of low power-consumption, which in one way is achieved by a decrease in the size of ICs. This has in turn led to a restriction on the number of I/O pins. Hence, it is necessary to use the available I/O pins efficiently. It also is necessary to ensure low-latency and high accuracy in the communication between the cores and the connected external devices. Further, multiple cores may generate multiple access requests for an I/O pin. Hence, it is necessary to prevent conflicts amongst the cores and the pins. Thus, access to the I/O pins by the cores is controlled with a control system.

In one known technique, an IC having multiple cores has a control system that includes an I/O bank with a set of I/O pins and software-implemented control logic to control access to the I/O pins, and thus, has software-level synchronization of access to the I/O pins. The software manages and assigns a state to each of the I/O pins, and the state of each of the I/O pins is known to all of the cores. Each of the I/O pins is in a locked state when a core accesses it, and in a free state when it is not being accessed by any of the cores. If a first core wants to write data to an external device, first it checks the state of a first I/O pin. When the first I/O pin is free, the first core provides the write data to the external device by way of an I/O register of an I/O bank. The first core then changes the state of the first I/O pin to the locked state. The I/O register stores the write data as pin data. Thus, the first core updates the pin data with the write data. If a second core wants to communicate with a second external device, then the second core generates an access request to access the I/O register. However, the second core cannot will not be able to access the first I/O pin because it is in the locked state, so the second core has to wait until the state of the first I/O pin changes from the locked state to the free state. This introduces software latency, which impacts system performance.

One way to overcome the software latency problem is to allocate a dedicated I/O bank to each core or core type. Thus, first and second cores of first and second types are allocated first and second I/O banks, respectively, which have corresponding first and second I/O registers. The control system then includes a control logic circuit. A first external device is connected to a first I/O pin of the first I/O bank, and a second external device is connected to a first I/O pin of the second I/O bank. The first and second cores are not supposed to access the second and first I/O banks, respectively (that is, they only access their own I/O bank). This allows the second core to control the second external device without a delay caused by the first core accessing a first external device. However, a problem arises when the number of external devices controlled by the first core is greater than the number of I/O pins available in the first I/O bank. Further, the number of external devices controlled by the second core may be less than the number of I/O pins available in the second I/O bank, so some of the I/O pins of the second I/O bank are unused. Further, to enable access to the first external device by the second core, the first external device must be disconnected from the first I/O pin of the first I/O bank and then connected to a second I/O pin of the second I/O bank. As the first and second cores, the additional control logic IC, and the first and second external devices are mounted on a single PCB, the disconnection and reconnection of the first external device requires modifications to the PCB wiring, which is undesirable. Further, if the first and second I/O registers are located in a memory shared by the first and second cores, it is possible that the first I/O register could be updated by the second core, resulting in corruption of the first I/O register pin data.

U.S. Pat. No. 6,532,533 ('533) discloses a technique to overcome the aforementioned problem. The technique includes storing pin data (i.e., contents of an I/O register) corresponding to an I/O bank in each of first and second memories allocated to first and second cores, respectively. The '533 patent further discloses assigning first and second sets of the I/O pins to the first and second cores, respectively. The first set of I/O pins includes first and second I/O pins of an I/O bank, and the second set of I/O pins includes third and fourth I/O pins of the I/O bank. The first and second cores generate first and second write data that is output on the first and second sets of I/O pins, respectively. The '533 patent further discloses that the control logic circuit generates first and second mask data corresponding to the first and second cores to selectively mask bits of the pin data. The control logic circuit updates bits of the pin data that correspond to the first set of I/O pins with bits of the first write data, and masks bits of the pin data that do not correspond to the first set of I/O pins. Each of the first and second cores stores the first and second mask data in the corresponding memory allocated thereto. Thus, the mask data corresponding to all the cores and the pin data is duplicated. Hence, this technique involves the use of a significant amount of memory space, which is undesirable. Further, if the software running on the first core introduces an error in the first mask, the first core may modify the first mask data to include the third I/O pin in the first set of I/O pins. Since the third I/O pin is pre-allocated to the second core, the second write data provided to the third I/O pin could get corrupted. Since the second core may execute software that is different and independent of the software running on the first core, this data corruption is difficult to debug.

It would be advantageous to have an IC that provides write access of a core to an I/O pin without delay and pin data corruption.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
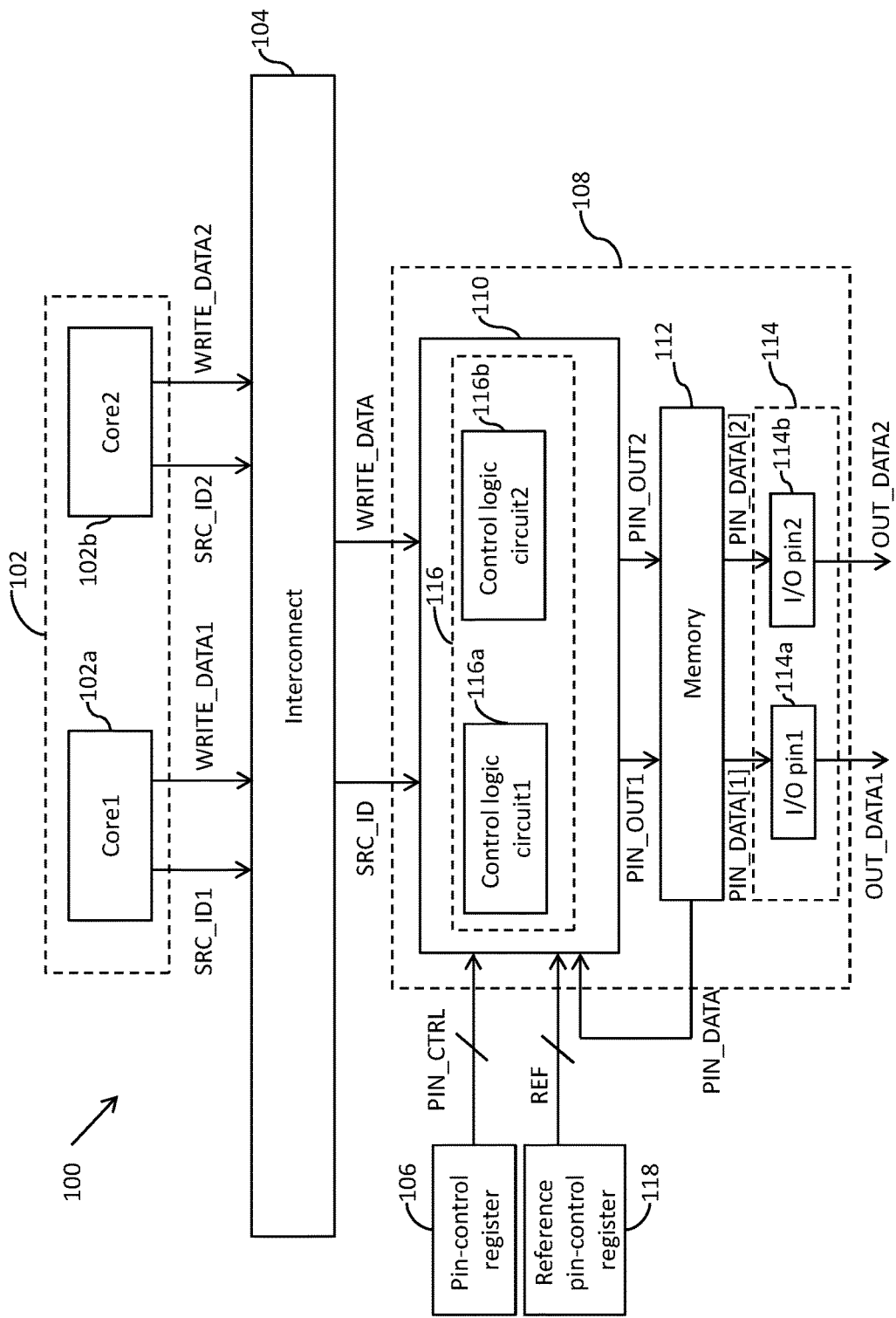
FIG. 1 is a schematic block diagram of an integrated circuit (IC) that includes a pin-control circuit in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an integrated circuit (IC) is provided. The IC is connected to a plurality of cores including a first core that provides a source identification (ID) and write data. The source ID indicates a type of the first core. The IC includes a pin-control circuit, a memory, and a set of input/output (I/O) pins including a first I/O pin. The pin-control circuit receives a set of pin-control values, a set of reference pin-control values, the source ID, and the write data. The pin-control circuit identifies a first pin-control value of the set of pin-control values based on the source ID and the set of reference pin-control values, and outputs a first bit of the write data. A first position of the first bit in the write data corresponds to a first position of the first pin-control value in the set of pin-control values. The memory stores pin data and is connected to the pin-control circuit to receive the first bit of the write data. The memory updates a first bit of the pin data with the first bit of the write data. A first position of the first bit in the pin data corresponds to the first position of the first bit in the write data. A first position of the first I/O pin in the set of I/O pins corresponds to the first position of the first bit in the write data. The set of I/O pins is connected to the memory and the first I/O pin receives and outputs the first bit of the write data.

In another embodiment of the present invention, an integrated circuit (IC) is provided. The IC includes a plurality of cores including a first core, a pin-control circuit, a memory, and a set of input/output (I/O) pins including a first I/O pin. The first core provides write data and a source identification (ID), which indicates a type of the first core. The pin-control circuit includes a set of control logic circuits including a first control logic circuit. The first control logic circuit includes first and second digital logic circuits. The set of control logic circuits is connected to the cores and receives a set of pin-control values and a set of reference pin-control values. The first digital logic circuit receives the reference pin-control values, the source ID, and a first pin-control value of the set of pin-control values, and generates a first intermediate signal based on the set of reference pin-control values, the source ID, and the first pin-control value. The first pin-control value indicates at least one type of core. The first digital logic circuit activates the first intermediate signal when the first pin-control value indicates the type of the first core. The second digital logic circuit receives a first bit of the write data and the first intermediate signal, and outputs a pin-out bit. The pin-out bit is the first bit of the write data when the first intermediate signal is active. A first position of the first bit in the write data corresponds to a first position of the first pin-control value in the set of pin-control values. The memory stores pin data and is connected to the set of control logic circuits including the first control logic circuit to receive the first bit of the write data. The memory updates a first bit of the pin data with the first bit of the write data. A first position of the first bit in the pin data corresponds to the first position of the first bit in the write data. The set of I/O pins corresponds to the set of control logic circuits, and is connected to the memory. A first position of the first I/O pin in the set of I/O pins corresponds to the first position of the first bit in the write data. The first I/O pin receives and outputs the first bit of the write data.

Various embodiments of the present invention provide an IC that controls write access to the I/O pins. The IC includes a pin-control circuit, a memory, and a set of I/O pins. In one embodiment, the IC is connected to a set of cores (which are part of a separate integrated circuit) including a first core that provides a first source ID and generates first write data, while in another, preferred embodiment, the cores, the pin-control circuit, memory and I/O pins are all integrated on the same die. The first source ID indicates a first type of the first core. A set of pin-control values is defined corresponding to the set of I/O pins to indicate a type of core that can access an I/O pin. A pin-control register stores the set of pin-control values. A position of a first pin-control value in the set of pin-control values corresponds to a position of a first I/O pin in the set of I/O pins. The pin-control circuit determines whether the first core can access a first I/O pin based on the first source ID and the first pin-control value. The pin-control circuit updates a bit of pin data stored in the memory with a corresponding bit of the write data when the first core has write access to the first I/O pin. However, the pin-control circuit cannot modify the bit of the pin data when the first core is denied write access to the first I/O pin.

The pin-control circuit allows write access by the first core to the first I/O pin such that the write access is independent of the write accesses of the set of cores to the set of I/O pins. Thus, the control system avoids the software latency problem previously discussed. Further, the pin-control circuit denies access by a core to the first I/O pin when the core is not of a first type. Thus, the pin-control circuit prevents corruption of pin data provided to the first pin. Further, write access to the I/O pins by various types of cores is programmed by defining the pin-control values during initialization of the cores.

Referring now to FIG. 1, a schematic block diagram of an integrated circuit (IC) 100 in accordance with an embodiment of the present invention is shown. The IC 100 includes a set of cores 102—two of which are shown—first and second cores 102a and 102b, an interconnect 104, and a pin-control register 106. In one embodiment, the IC 100 includes a control system 108, and in another embodiment, the control system 108 is implemented as a separate IC that is connected to the IC 100. The control system 108 includes a pin-control circuit 110, a memory 112, and a set of I/O pins 114—two of which are shown—first and second I/O pins 114a and 114b. The set of I/O pins 114 is sometimes referred to as an "I/O bank". First and second external devices (not shown) are connected to the corresponding first and second I/O pins 114a and 114b, respectively. The pin-control circuit 110 includes a set of control logic circuits 116 —two of which are shown—first and second control logic circuits 116a and 116b corresponding to the first and second I/O pins 114a and 114b. The IC 100 also includes a reference pin-control register 118.

The first and second cores 102a and 102b have first and second source identifications (ID) SRC_ID1 and SRC_ID2, respectively, associated therewith. A source ID SRC_ID of a core indicates a type thereof. The type of core indicates the processing capacity and function of the core. Examples of core types include a general purpose processor core, a graphics processor, and a digital signal processor. In one embodiment, the first core 102a is of a first type, and the second core 102b is of a second type. The first and second cores 102a and 102b generate first and second write data WRITE_DATA1 and WRITE_DATA2, respectively. The first and second write data WRITE_DATA1 and WRITE_DATA2 include first and second sets of bits, respectively. In one embodiment, the number of bits in a set of bits of write data WRITE_DATA is equal to the number of I/O pins in the set of I/O pins 114. Positions of the first bit and a second bit in the first set of bits WRITE_DATA1[1] and WRITE_DATA1[2] correspond to positions of the first and second I/O pins 114a and 114b in the set of I/O pins 114. For example, a first bit of the first set of bits WRITE_DATA1[1] may be provided to the first external device by way of the first I/O pin 114a, and similarly, positions of first and second bits in the second set of bits WRITE_DATA2[1] and WRITE_DATA2[2] correspond to the positions of the first and second I/O pins 114a and 114b in the set of I/O pins 114.

The pin-control register 106 corresponds to the set of I/O pins 114 and stores a set of pin-control values PIN_CTRL including first and second pin-control values PIN_CTRL1 and PIN_CTRL2 corresponding to the first and second I/O pins 114a and 114b. Each of the first and second pin-control values PIN_CTRL1 and PIN_CTRL2 indicates the types of cores that control the corresponding first and second I/O pins 114a and 114b.

In one embodiment, a third core (not shown) of the set of cores 102 is a master core that performs software initialization of the set of cores 102. The third core defines the first and second pin-control values PIN_CTRL1 and PIN_CTRL2 during software initialization of the set of cores 102. The first and second pin-control values PIN_CTRL1 and PIN_CTRL2 remain constant thereafter. In another embodiment, one of the first or second cores 102a or 102b performs the function of the master core.

The reference pin-control register 118 stores a set of reference pin-control values REF including first through third reference pin-control values REF1-REF3. The first and second reference pin-control values REF1 and REF2 represent the first and second types of cores, respectively. The third reference pin-control value REF3 represents both the first and second types of cores.

For example, the first through third reference pin-control values REF1-REF3 may be 0b00, 0b01, and 0b11, respectively. Further, during software initialization of the set of cores 102, the third core (i.e., the master core) establishes that the first I/O pin 114a is controlled by the first type of core and the second I/O pin 114b is controlled by the second type of core. Hence, the third core defines the first pin-control value PIN_CTRL1 as 0b00 and the second pin-control value PIN_CTRL2 as 0b01. The pin-control register 106 stores the set of pin-control values PIN_CTRL as 0b0001.

The set of control logic circuits 116 includes first and second control logic circuits 116a and 116b corresponding to the first and second I/O pins 114a and 114b. The number of control logic circuits in the set of control logic circuits 116 is equal to the number of I/O pins in the set of I/O pins 114. The set of control logic circuits 116 is connected to the set of cores 102 by way of the interconnect 104. In one embodiment, the first and second control logic circuits 116a and 116b are connected to the first core 102a to receive the first source ID SRC_ID1 and the first write data WRITE_DATA1 in a first clock cycle. The first and second control logic circuits 116a and 116b receive the first and second bits of the first write data WRITE_DATA1[1] and WRITE_DATA1[2], respectively. Similarly, the first and second control logic circuits 116a and 116b are connected to the second core 102b to receive the second source ID SRC_ID2 and the second write data WRITE_DATA2 in a second clock cycle. The first and second control logic circuits 116a and 116b receive the first and second bits of the second write data WRITE_DATA2[1] and WRITE_DATA2[2], respectively. The first and second control logic circuits 116a and 116b are connected to the pin-control register 106 to receive the first and second pin-control values PIN_CTRL1 and PIN_CTRL2, respectively. The first and second control logic circuits 116a and 116b are connected to the reference pin-control register 118 to receive the first through third reference pin-control values REF1-REF3.

The first control logic circuit 116a allows a write access of the first core 102a to the first I/O pin 114a in the first clock cycle based on the first source ID SRC_ID1, the first pin-control value PIN_CTRL1, and the first through third reference pin-control values REF1-REF3. The second control logic circuit 116b is structurally and functionally similar to the first control logic circuit 116a. The second control logic circuit 116b allows a write access of the second core 102b to the second I/O pin 114b based on the second source ID SRC_ID2, the second pin-control value PIN_CTRL2, and the first through third reference pin-control values REF1-REF3. Hence, the first and second control logic circuits 116a and 116b output the first bit of the first write data WRITE_DATA1[1] and the second bit of the second write data WRITE_DATA2[2] as first and second pin-out bits PIN_OUT1 and PIN_OUT2 in the first and second clock cycles, respectively. The first and second pin-out bits PIN_OUT1 and PIN_OUT2 are collectively referred to as 'pin-out data PIN_OUT'.

The memory 112 is connected to the set of control logic circuits 116 to receive the pin-out data PIN_OUT. The memory 112 stores pin-out data PIN_OUT as pin data PIN_DATA (i.e., the first and second pin-out bits PIN_OUT1 and PIN_OUT2 as first and second bits of the pin data PIN_DATA[1] and PIN_DATA[2]). The number of bits of the pin data PIN_DATA is equal to the number of I/O pins in the set of I/O pins 114. The bits of the pin data PIN_DATA are output on the corresponding I/O pins of the set of I/O pins 114.

The first and second control logic circuits 116a and 116b are connected to the memory 112 to receive the pin data PIN_DATA. During the second clock cycle, the first control logic circuit 116a denies the second core 102b a write access to the first I/O pin 114a based on the second source ID SRC_ID2, the first pin-control value PIN_CTRL1, and the first through third reference pin-control values REF1-REF3. Hence, the first control logic circuit 116a outputs the first bit of the pin data PIN_DATA[1] as the first pin-out bit PIN_OUT1.

The set of I/O pins 114 is connected to the memory 112 to receive the first and second bits of the pin data PIN_DATA[1] and PIN_DATA[2]. The set of I/O pins 114 provides the first and second bits of the pin data PIN_DATA[1] and PIN_DATA[2] as first and second output data bits OUT_DATA1 and OUT_DATA2 to the first and second external devices, respectively.

Figure 2:
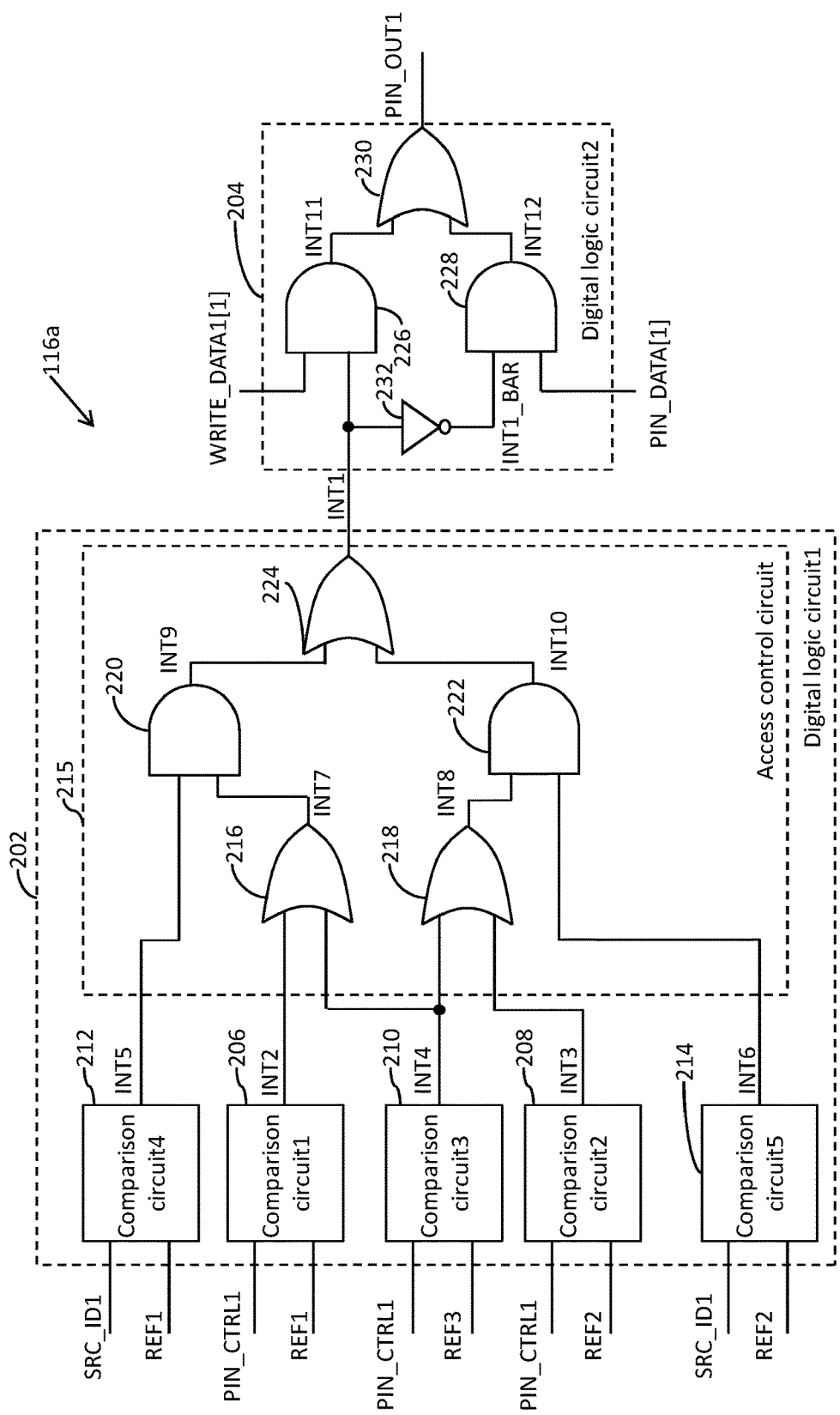
FIG. 2 is a schematic block diagram of a control logic circuit of the pin-control circuit of FIG. 1 in accordance with an embodiment of the present invention.

Referring now to FIG. 2, a schematic block diagram of the first control logic circuit 116a in accordance with an embodiment of the present invention is shown. The first control logic circuit 116a includes a first digital logic circuit 202 and a second digital logic circuit 204. The first and second control logic circuits 116a and 116b correspond to the first and second I/O pins 114a and 114b. The first digital logic circuit 202 includes first through fifth comparison circuits 206-214 and an access control circuit 215. The access control circuit 215 includes first through third OR gates 216, 218, and 224, and first and second AND gates 220 and 222. The second digital logic circuit 204 includes third and fourth AND gates 226 and 228, a fourth OR gate 230, and an inverter 232.

In an embodiment, the first digital logic circuit 202 is connected to the interconnect 104 to receive the first source ID SRC_ID1, the pin-control register 106 to receive the first pin-control value PIN_CTRL1, and the reference pin-control register 118 to receive the first through third reference pin-control values REF1-REF3. The first digital logic circuit 202 generates a first intermediate signal INT1. The second digital logic circuit 204 is connected to the first digital logic circuit 202 to receive the first intermediate signal INT1, the interconnect 104 to receive the first bit of the first write data WRITE_DATA1[1], and the memory 112 to receive the first bit of the pin data PIN_DATA[1]. The second digital logic circuit 204 outputs one of the first bit of the first write data WRITE_DATA1[1] or the first bit of the pin data PIN_DATA[1] based on whether the first intermediate signal INT1 is active or inactive.

The first comparison circuit 206 receives the first reference pin-control value REF1 and the first pin-control value PIN_CTRL1. The first comparison circuit 206 compares the first pin-control value PIN_CTRL1 with the first reference pin-control value REF1 and generates a second intermediate signal INT2. The second comparison circuit 208 receives the second reference pin-control value REF2 and the first pin-control value PIN_CTRL1. The second comparison circuit 208 compares the first pin-control value PIN_CTRL1 with the second reference pin-control value REF2 and generates a third intermediate signal INT3. The third comparison circuit 210 receives the third reference pin-control value REF3 and the first pin-control value PIN_CTRL1. The third comparison circuit 210 compares the first pin-control value PIN_CTRL1 with the third reference pin-control value REF3 and generates a fourth intermediate signal INT4.

The fourth comparison circuit 212 receives the first reference pin-control value REF1 and the first source ID SRC_ID1. The fourth comparison circuit 212 compares the first source ID SRC_ID1 with the first reference pin-control value REF1 and generates a fifth intermediate signal INT5. The fifth comparison circuit 214 receives the second reference pin-control value REF2 and the first source ID SRC_ID1. The fifth comparison circuit 214 compares the first source ID SRC_ID1 with the second reference pin-control value REF2 and generates a sixth intermediate signal INT6.

The first OR gate 216 is connected to the first and third comparison circuits 206 and 210 to receive the second and fourth intermediate signals INT2 and INT4, respectively, and generates a seventh intermediate signal INT7. The second OR gate 218 is connected to the second and third comparison circuits 208 and 210 to receive the third and fourth intermediate signals INT3 and INT4, respectively, and generates an eighth intermediate signal INT8.

The first AND gate 220 is connected to the fourth comparison circuit 212 and the first OR gate 216 to receive the fifth and seventh intermediate signals INT5 and INT7, respectively, and generates a ninth intermediate signal INT9. The second AND gate 222 is connected to the fifth comparison circuit 214 and the second OR gate 218 to receive the sixth and eighth intermediate signals INT6 and INT8, respectively, and generates a tenth intermediate signal INT10.

The third OR gate 224 is connected to the first and second AND gates 220 and 222 to receive the ninth and tenth intermediate signals INT9 and INT10, respectively, and generates the first intermediate signal INT1.

The third AND gate 226 receives the first bit of the first write data WRITE_DATA1[1], is connected to the third OR gate 224 to receive the first intermediate signal INT1 and generates an eleventh intermediate signal INT11. The inverter 232 is connected to the third OR gate 224 to receive the first intermediate signal INT1 and generates an inverted version of the first intermediate signal INT1_BAR.

The fourth AND gate 228 is connected to the memory 112 and the inverter 232 to receive the first bit of the pin data PIN_DATA[1] and the inverted version of the first intermediate signal INT1_BAR, respectively, and generates a twelfth intermediate signal INT12. The fourth OR gate 230 is connected to the third and fourth AND gates 226 and 228 to receive the eleventh and twelfth intermediate signals INT11 and INT12 and generates the first pin-out bit PIN_OUT1.

In operation, the interconnect 104 simultaneously receives the first and second source IDs SRC_ID1 and SRC_ID2 and the first and second write data WRITE_DATA1 and WRITE_DATA2. The interconnect 104 outputs the first source ID SRC_ID1 and the first write data WRITE_DATA1 in a first clock cycle and the second source ID SRC_ID2 and the second write data WRITE_DATA2 in a second clock cycle. It will be understood by a person skilled in the art that the first and second clock cycles may not be consecutive to each other. In an embodiment, the first pin-control value PIN_CTRL1 is equal to the first reference pin-control value REF1, and the second pin-control value PIN_CTRL2 is equal to the second reference pin-control value REF2.

The first digital logic circuit 202 receives the first pin-control value PIN_CTRL1 and the first through third reference pin-control values REF1-REF3. The first comparison circuit 206 compares the first pin-control value PIN_CTRL1 with the first reference pin-control value REF1 and activates the second intermediate signal INT2. In the first clock cycle, the first digital logic circuit 202 receives the first source ID SRC_ID1. The fourth comparison circuit 212 compares the first source ID SRC_ID1 with the first reference pin-control value REF1 and activates the fifth intermediate signal INT5. In an embodiment, the second and fifth intermediate signals INT2 and INT5 are activated and output at a first logic state. Since each of the first pin-control value PIN_CTRL1 and the first source ID SRC_ID1 do not match the second and third reference pin-control values REF2 and REF3, the second, third, and fifth comparison circuits 208, 210, and 214 do not activate the third, fourth, and sixth intermediate signals INT3, INT4, and INT6, respectively. Hence, the third, fourth, and sixth intermediate signals INT3, INT4, and INT6 are generated at a second logic state.

The first OR gate 216 receives the second and fourth intermediate signals INT2 and INT4 at the first and second logic states, respectively, and generates the seventh intermediate signal INT7 at the first logic state. The first AND gate 220 receives the seventh and fifth intermediate signals INT7 and INT5 at the first logic state and generates the ninth intermediate signal INT9 at the first logic state. Since the third, fourth, and sixth intermediate signals INT3, INT4, and INT6 are at the second logic state, the second OR gate 218 and the second AND gate 222 output the eighth and tenth intermediate signals INT8 and INT10, respectively, at the second logic state. The third OR gate 224 receives the ninth and tenth intermediate signals INT9 and INT10 at the first and second logic states, respectively, and generates the first intermediate signal INT1 at the first logic state.

The third AND gate 226 receives the first intermediate signal INT1 at the first logic state and a first bit of the first write data WRITE_DATA1[1] and outputs the first bit of the first write data WRITE_DATA1[1] as the eleventh intermediate signal INT11. The fourth AND gate 228 receives an inverted version of the first intermediate signal INT1_BAR at the second logic state and the first bit of the PIN_DATA[1] and outputs the twelfth intermediate signal INT12 at the second logic state. The fourth OR gate 230 receives the twelfth intermediate signal INT12 and the first bit of the first write data WRITE_DATA1[1] as the eleventh intermediate signal INT11 and outputs the first write data WRITE_DATA1[1] as the first pin-out bit PIN_OUT1.

The first pin-out bit PIN_OUT1 overwrites and, thus, updates the first bit of the pin data PIN_DATA[1]. The memory 112 outputs the first bit of the pin data PIN_DATA[1] on the first I/O pin 114a. Thus, the first control logic circuit 116a allows the first core 102a to provide the first bit of the first write data WRITE_DATA1[1] to the first I/O pin 114a.

In the second clock cycle, the first digital logic circuit 202 receives the second source ID SRC_ID2. The fifth comparison circuit 214 compares the second source ID SRC_ID2 with the second reference pin-control value REF2 and activates the sixth intermediate signal INT6. Thus, the fifth comparison circuit 214 outputs the sixth intermediate signal INT6 at the first logic state. Since the second source ID SRC_ID2 does not match the first reference pin-control value REF1, the fourth comparison circuit 212 inactivates the fifth intermediate signal INT5. Thus, the third, fourth, and fifth intermediate signals INT3, INT4, and INT5 are generated at the second logic state. Hence, the first digital logic circuit 202 generates the first intermediate signal INT1 at the second logic state.

The second digital logic circuit 204 receives the first intermediate signal INT1 at the second logic state and outputs the first bit of the pin data PIN_DATA[1] as the first pin-out bit PIN_OUT1. The first pin-out bit PIN_OUT1 is stored in the memory 112 at the position of the first bit of the PIN_DATA[1]. Thus, the first bit of the pin data PIN_DATA[1] remains unchanged. The first control logic circuit 116a denies the write access of the second core 102b to the first I/O pin 114a. However, the second control logic circuit 116b receives the second pin-control value PIN_CTRL2 and the first through third reference pin-control values REF1-REF3. In the second clock cycle, the second control logic circuit 116b receives the second source ID SRC_ID2 and a first bit of the second write data WRITE_DATA2[1]. Since the second pin-control value PIN_CTRL2 and the second source ID SRC_ID2 are equal to the second reference pin-control value REF2, the second control logic circuit 116b determines that the second core 102b provides the first bit of the second write data WRITE_DATA2[1] to the second I/O pin 114b.

In one embodiment, the set of I/O pins 114, further, includes a third I/O pin (not shown) and the set of pin-control values PIN_CTRL in the pin-control register 106 further includes a third pin-control value PIN_CTRL3. The position of the third pin-control value PIN-CTRL3 corresponds to a position of the third I/O pin. The third pin-control value PIN_CTRL3 is equal to the third reference pin-control value REF3. A position of a third bit of the first write data WRITE_DATA1[3] in the first write data WRITE_DATA1 corresponds to the position of the third I/O pin in the set of I/O pins 114. Similarly, a position of a third bit of the second write data WRITE_DATA2[3] in the second write data WRITE_DATA2 corresponds to the position of the third I/O pin in the set of I/O pins 114. Hence, the pin-control circuit 110 determines that the first and second cores 102a and 102b provide the second bits of the first and second write data WRITE_DATA1[2] and WRITE_DATA2[2] to the third I/O pin in the first and second clock cycles, respectively.

The set of pin-control values PIN_CTRL is defined during the software initialization of the set of cores 102. This ensures dedicated allocation of I/O pins of the set of I/O pins 114 to either the first type of cores or the second type of cores, or both the first and second types of cores. Further, during the run time of the set of cores 102, the pin-control circuit 110 allows write access of at least one of the first and second cores 102a and 102b to at least one of the first and second I/O pins 114a and 114b based on an identification of the type of cores. This ensures that the write access of the first core 102a to the first I/O pin 114a is independent of the write access of the second core 102b to the second I/O pin 114b, which prevents corruption of the pin data that is to be written to an I/O pin and reduces latency in communication between the set of cores 102 and external devices.

It will be further understood by those with skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An integrated circuit connected to a plurality of cores including a first core that provides a source identification (ID) and write data, wherein the source ID indicates a type of the first core, the integrated circuit comprising:
   a pin-control circuit that (i) receives a set of pin-control values and a set of reference pin-control values, (ii) receives the source ID and the write data, (iii) identifies a first pin-control value of the set of pin-control values based on the source ID and the set of reference pin-control values, and (iv) outputs a first bit of the write data based on a first position of the first pin-control value, wherein a first position of the first bit of the write data corresponds to the first position of the first pin-control value;
   a memory, connected to the pin-control circuit, that (i) stores pin data, (ii) receives the first bit of the write data, and (iii) updates a first bit of the pin data with the first bit of the write data, wherein a first position of the first bit of the pin data corresponds to the first position of the first bit of the write data; and
   a set of input/output (I/O) pins, connected to the memory, that includes a first I/O pin that receives and outputs the first bit of the write data, wherein a first position of the first I/O pin corresponds to the first position of the first bit of the write data,
   wherein: (i) the first position of the first pin-control value corresponds to the first position of the first I/O pin, and (ii) the first pin-control value indicates at least one type of core that can controls the first I/O pin, and (iii) the pin-control circuit includes a set of control logic circuits corresponding to the set of I/O pins, and
   wherein a first control logic circuit of the set of control logic circuits comprises:

a first digital logic circuit that receives the set of reference pin-control values, the source ID, and the first pin-control value, and generates a first intermediate signal that is active when the first core controls the first I/O pin as determined by the set of reference pin-control values, the source ID, and the first pin-control value; and a second digital logic circuit that receives the first bits of the write data and the pin data, and outputs a pin-out bit, wherein the pin-out bit is the first bit of the write data when the first intermediate signal is active, and the first bit of the pin data when the first intermediate signal is inactive.

2. The integrated circuit of claim 1, wherein the first digital logic circuit comprises:

a first comparison circuit that receives the first pin-control value and a first reference pin-control value, and generates a second intermediate signal that is active when the first pin-control value matches the first reference pin-control value;

a second comparison circuit that receives the first pin-control value and a second reference pin-control value, and generates a third intermediate signal that is active when the first pin-control value matches the second reference pin-control value;

a third comparison circuit that receives the first pin-control value and a third reference pin-control value, and generates a fourth intermediate signal that is active when the first pin-control value matches the third reference pin-control value;

a fourth comparison circuit that receives the source ID and the first reference pin-control value, and generates a fifth intermediate signal that is active when the source ID matches the first reference pin-control value;

a fifth comparison circuit that receives the source ID and the second reference pin-control value, and generates a sixth intermediate signal that is activated by the fifth comparison circuit when the source ID matches the second reference pin-control value; and an access control circuit that receives the second through sixth intermediate signals, and generates the first intermediate signal, wherein the access control circuit includes first through fifth logic gates.

3. The integrated circuit of claim 2, wherein the first reference pin-control value indicates a first type of core, the second reference pin-control value indicates a second type of core, and the third reference pin-control value indicates both the first and second types of core.

4. The integrated circuit of claim 2, wherein the second digital logic circuit comprises:

a sixth logic gate that receives the first bit of the write data and the first intermediate signal, and generates a seventh intermediate signal, wherein the seventh intermediate signal is the first bit of the write data when the first intermediate signal is active;

a seventh logic gate that receives the first bit of the pin data and an inverted version of the first intermediate signal, and generates an eighth intermediate signal, wherein the eighth intermediate signal is the first bit of the pin data when the first intermediate signal is inactive; and an eighth logic gate that receives the seventh and eighth intermediate signals, and generates the pin-out bit, wherein the pin-out bit is the first bit of the write data when the first intermediate signal is active and the first bit of the pin data when the first intermediate signal is inactive.

5. The integrated circuit of claim 1, wherein:

the pin-control circuit identifies a second pin-control value of the set of pin-control values based on the source ID, and outputs a second bit of the write data based on a second position of the second pin-control value in the set of pin-control values, a second position of the second bit in the write data corresponds to the second position of the second pin-control value, and the second pin-control value indicates at least one type of core that controls a second I/O pin.

6. The integrated circuit of claim 5, wherein:

the set of I/O pins includes the second I/O pin that receives and outputs the second bit of the write data, and a second position of the second I/O pin corresponds to the second position of the second bit of the write data.

7. The integrated circuit of claim 6, wherein the first pin-control value equals the second pin-control value.

8. The integrated circuit of claim 1, further comprising a pin-control register and a reference pin-control register, connected to the pin-control circuit, for storing the set of pin-control values and the set of reference pin-control values, respectively.

9. An integrated circuit, comprising:

a plurality of cores including a first core, wherein the first core provides a source identification (ID) and write data, and wherein the source ID indicates a type of the first core;

a pin-control circuit, connected to the plurality of cores, that receives a set of pin-control values and a set of reference pin-control values, and includes a set of control logic circuits including a first control logic circuit;

a memory, connected to the set of control logic circuits, that stores pin data, receives the first bit of the write data, and updates a first bit of the pin data with the first bit of the write data, wherein a first position of the first bit in the pin data corresponds to the first position of the first bit in the write data; and a set of input/output (I/O) pins connected to the memory, that corresponds to the set of control logic circuits, wherein the set of I/O pins includes a first I/O pin that receives and outputs the first bit of the write data, and wherein a first position of the first I/O pin corresponds to the first position of the first bit in the write data, wherein the first control logic circuit comprises:

a first digital logic circuit that receives the set of reference pin-control values, the source ID, and a first pin-control value of the set of pin-control values, and generates a first intermediate signal based on the set of reference pin-control values, the source ID, and the first pin-control value, wherein the first pin-control value indicates at least one type of core, and wherein the first digital logic circuit activates the first intermediate signal when the first pin-control value indicates the type of the first core;

a second digital logic circuit that receives a first bit of the write data and the first intermediate signal, and outputs a pin-out bit, wherein the pin-out bit is the first bit of the write data when the first intermediate signal is active, and wherein a first position of the first bit in the write data corresponds to a first position of the first pin-control value in the set of pin-control values; and a pin-control register and a reference pin-control register, connected to the pin-control circuit, for respectively storing the set of pin-control values and the set of reference pin-control values.

10. The integrated circuit of claim 9, wherein the first position of the first pin-control value in the set of pin-control values corresponds to the first position of the first I/O pin in the set of the I/O pins.

11. The integrated circuit of claim 10, wherein the second digital logic circuit further receives the first bit of the pin data, and outputs the first bit of the pin data as the pin-out bit when the first intermediate signal is inactive.

12. The integrated circuit of claim 11, wherein the first digital logic circuit comprises:
a first comparison circuit that receives the first pin-control value and a first reference pin-control value, and generates a second intermediate signal, wherein the first comparison circuit activates the second intermediate signal when the first pin-control value matches the first reference pin-control value;
a second comparison circuit that receives the first pin-control value and a second reference pin-control value, and generates a third intermediate signal, wherein the second comparison circuit activates the third intermediate signal when the first pin-control value matches the second reference pin-control value;
a third comparison circuit that receives the first pin-control control value and a third reference pin-control value, and generates a fourth intermediate signal, wherein the third comparison circuit activates the fourth intermediate signal when the first pin-control value matches the third reference pin-control value;
a fourth comparison circuit that receives the source ID and the first reference pin-control value, and generates a fifth intermediate signal, wherein the fourth comparison circuit activates the fifth intermediate signal when the source ID matches the first reference pin-control value;
a fifth comparison circuit that receives the source ID and the second reference pin-control value, and generates a sixth intermediate signal, wherein the fifth comparison circuit activates the sixth intermediate signal when the source ID matches the second reference pin-control value; and
an access control circuit that receives the second through sixth intermediate signals, and generates the first intermediate signal, wherein the access control circuit includes first through fifth logic gates.

13. The integrated circuit of claim 12, wherein the first reference pin-control value indicates a first type of core, the second reference pin-control value indicates a second type of core, and the third reference pin-control value indicates both the first and second types of core.

14. The integrated circuit of claim 12, wherein the second digital logic circuit comprises:
a sixth logic gate that receives the first bit of the write data and the first intermediate signal, and generates a seventh intermediate signal, wherein the seventh intermediate signal is the first bit of the write data when the first intermediate signal is active;
a seventh logic gate that receives the first bit of the pin data and an inverted version of the first intermediate signal, and generates an eighth intermediate signal, wherein the eighth intermediate signal is the first bit of the pin data when the first intermediate signal is inactive; and
an eighth logic gate that receives the seventh and eighth intermediate signals, and generates the pin-out bit, wherein the pin-out bit is the first bit of the write data when the first intermediate signal is active and the first bit of the pin data when the first intermediate signal is inactive.

15. The integrated circuit of claim 9, wherein:
the pin-control circuit identifies a second pin-control value of the set of pin-control values based on the source ID, and outputs a second bit of the write data based on a second position of the second pin-control value in the set of pin-control values,
a second position of the second bit in the write data corresponds to the second position of the second pin-control value in the set of pin-control values, and
the second pin-control value indicates at least one type of core that controls the second I/O pin.

16. The integrated circuit of claim 15, wherein the set of I/O pins includes a second I/O pin that receives and outputs the second bit of the write data, and wherein a second position of the second I/O pin corresponds to the second position of the second bit of the write data.

17. The integrated circuit of claim 16, wherein the first pin-control value equals the second pin-control value.

* * * * *